(12) United States Patent
Beon et al.

(10) Patent No.: US 9,235,081 B2
(45) Date of Patent: Jan. 12, 2016

(54) DISPLAY DEVICE INCLUDING LENS

(71) Applicant: SAMSUNG DISPLAY CO., LTD., Yongin, Gyeonggi-Do (KR)

(72) Inventors: Beong-Hun Beon, Hwaseong-Si (KR); Ji-Hoon Kim, Hwaseong-Si (KR); Seung Beom Park, Hwaseong-Si (KR); Sang-Gu Lee, Hwaseong-Si (KR); Seung Hee Lee, Hwaseong-Si (KR); Yun Jang, Hwaseong-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/300,665

(22) Filed: Jun. 10, 2014

(65) Prior Publication Data

US 2015/0219959 A1 Aug. 6, 2015

(30) Foreign Application Priority Data

Feb. 5, 2014 (KR) .......................... 10-2014-0013244

(51) Int. Cl.
*G02F 1/1335* (2006.01)

(52) U.S. Cl.
CPC .... *G02F 1/133526* (2013.01); *G02F 1/133621* (2013.01)

(58) Field of Classification Search
CPC .............................................. G02F 1/133621
See application file for complete search history.

(56) References Cited

U.S. PATENT DOCUMENTS

| | | | |
|---|---|---|---|
| 5,699,184 A * | 12/1997 | Hall | 359/465 |
| 6,788,274 B2 * | 9/2004 | Kakeya | 345/7 |
| 7,974,007 B2 | 7/2011 | Jung | |
| 2003/0063186 A1 | 4/2003 | Tomono | |
| 2011/0242100 A1 | 10/2011 | Yamazaki et al. | |
| 2012/0013601 A1 | 1/2012 | Park et al. | |
| 2012/0013606 A1 * | 1/2012 | Tsai et al. | 345/419 |
| 2012/0113159 A1 | 5/2012 | Chiba et al. | |
| 2013/0076737 A1 | 3/2013 | Park et al. | |
| 2013/0169895 A1 * | 7/2013 | Shih et al. | 349/15 |
| 2014/0016051 A1 * | 1/2014 | Kroll et al. | 349/15 |

FOREIGN PATENT DOCUMENTS

| | | |
|---|---|---|
| KR | 10-2009-0089694 | 8/2009 |
| KR | 10-2012-0031400 | 4/2012 |
| KR | 10-2012-0095217 | 8/2012 |
| KR | 10-1190110 | 10/2012 |

* cited by examiner

*Primary Examiner* — Timothy L Rude
(74) *Attorney, Agent, or Firm* — F. Chau & Associates, LLC

(57) ABSTRACT

A display device includes a lens with an adjustable refractive index. The display device includes a display panel including a plurality of pixels, a backlight unit positioned at a back side of the display panel to emit light of a first color and light of a second color to the display panel at different times, the first color and the second color being different from each other; and a lens unit positioned at a front side of the display panel to form at least one lens in a 3D mode. The lens unit includes a plurality of electrodes for adjusting a refractive index of the lens, and a signal applied to the electrodes when the backlight unit emits the light of the first color is different from a signal applied to the electrodes when the backlight unit emits the light of the second color.

10 Claims, 13 Drawing Sheets

DISPLAY DEVICE INCLUDING LENS

CROSS-REFERENCE TO RELATED APPLICATION

This application claims priority to and the benefit of Korean Patent Application No. 10-2014-0013244 filed in the Korean Intellectual Property Office on Feb. 5, 2014, the entire contents of which are herein incorporated by reference.

TECHNICAL FIELD

The present invention relates to a display device, and more particularly, to a display device including a lens.

DISCUSSION OF THE RELATED ART

Modern display devices may be self-emissive, and may therefore be capable of emitting light by themselves. Examples of self-emissive display devices include a light emitting diode display (LED), a field emission display (FED), a vacuum fluorescent display (VFD), and a plasma display panel (PDP). Modern display devices may alternatively be non-emissive, and may therefore not be capable of emitting light by themselves, but rather, they may require a light source for the provision of light. Examples of non-emissive display devices include a liquid crystal display (LCD) and an electrophoretic display.

The non-emissive display device includes a display panel including a plurality of pixels and a plurality of signal lines connected thereto, a driver for driving the display panel, and a backlight unit for supplying light to the display panel.

Each of the pixels includes at least one switching element connected a signal line, at least one pixel electrode connected thereto, and an opposite electrode disposed to face the pixel electrode. The pixel electrode is connected to at least one switching element such as a thin film transistor to receive a data voltage. The opposed electrode may receive a common voltage Vcom.

The signal line includes a data line for transferring a data voltage and a gate line for transferring a gate signal.

The driver may include a data driver for applying the data voltage to the data line, and a gate driver for applying a gate signal to the gate line.

The backlight unit includes at least one light source for emitting light. Examples of suitable light sources include a cold cathode fluorescent lamp (CCFL), a flat fluorescent lamp (FFL), and a light emitting diode (LED), and the like. LEDs may be well suited for use as backlights owing to their low power consumption and a small heat value.

Liquid crystal display may be able to produce images of various colors by permitting each pixel to uniquely display a primary color or each pixel PX may alternately display each of the primary colors over time. A desired color may thereby be recognized by a spatial or temporal sum of the primary colors. When each pixel uniquely displays one of the primary colors, each pixel may include a color filter representing one of the primary colors in a region corresponding to the pixel electrode. These color filters may be regularly arranged along pixel columns or pixel rows.

Some display devices are capable of displaying three-dimensional (3D) images. In a 3D display, stereoscopic perception of an object is represented by using binocular parallax. When different 2D images are projected to a left eye and a right eye, respectively, and the image projected to the left eye (hereinafter referred to as a "left-eye image") and the image projected to the right eye (hereinafter referred to as a "right-eye image") are transferred to a brain, the left-eye image and the right-eye image are combined in the brain to be recognized as a 3D image having a perception of depth.

The 3D display device thereby uses binocular parallax. Examples of 3D display devices include a stereoscopic 3D display device using glasses such as shutter glasses, polarized glasses, or the like, and an autostereoscopic 3D display device in which an optical system such as a lenticular lens, a parallax barrier, or the like is used. Autostereoscopic 3D display devices thus do not require the use of special glasses.

SUMMARY 3D image display devices may use a lens to direct different images to a viewer's left and right eyes. However, the lens, having a single refractive index, may tend to bend light of different colors to different extents. This may create chromatic aberration in the displayed image as the different primary colors of the various pixels appear to separate. Accordingly, a focal point of an image of each viewpoint becomes different for each primary color, and thus a 3D image may appear blurred or may appear to have moiré patterning.

Exemplary embodiments of the present invention may increase a display quality of a display device by equalizing the focal length of each displayed primary color.

An exemplary embodiment of the present invention provides a display device including a display panel. The display panel is divided into a plurality of pixels. A backlight unit is positioned at a back side of the display panel to emit light of a first color and light of a second color to the display panel at different times. The first color and the second color are different from each other. A lens unit is positioned at a front side of the display panel to form at least one lens in a 3D mode. The lens unit includes a plurality of electrodes for adjusting a refractive index of the lens. A signal applied to the electrodes when the backlight unit emits the light of the first color is different from a signal applied to the electrodes when the backlight unit emits the light of the second color.

The refractive index of the lens when the backlight unit emits the light of the first color may be different from the refractive index of the lens when the backlight unit emits the light of the second color.

The lens may include one of a gradient index (GRIN) lens or a Fresnel lens.

The lens unit may further include a first substrate and a second substrate facing the first substrate. A liquid crystal layer is positioned between the first substrate and the second substrate. The electrodes include a plurality of first electrodes and a plurality of second electrodes positioned on the first substrate.

The first electrodes may be positioned at a different layer from a layer at which the second electrodes are positioned.

The lens unit may further include a common electrode positioned on the second substrate configured to receive a common voltage.

A voltage difference between the common electrode and the first electrode or the second electrode when the backlight unit emits the light of the first color may be different from a voltage difference between the common electrode and the first electrode or the second electrode when the backlight unit emits the light of the second color.

An image of the first color and an image of the second color for the same viewpoint may be focused at a same position for the viewpoint through the lens unit in a 3D mode.

An exemplary embodiment of the present invention provides a method for driving a display panel. The display panel includes a plurality of pixels, a backlight unit positioned at a back side of the display panel, and a lens unit positioned at a front side of the display panel and including a plurality of electrodes. The method includes emitting light of a first color from the backlight unit to the display panel. The lens unit forms a lens by applying a first signal to the electrodes when the backlight unit emits light of the first color. The backlight unit emits light of a second color that is different from the first color at a time that is different from a time when the light of the first color is emitted. The lens unit forms a lens by applying a second signal that is different from the first signal to the electrodes when the backlight unit emits light of the second color.

The refractive index of the lens when the backlight unit emits the light of the first color may be different from the refractive index of the lens when the backlight unit emits the light of the second color.

The lens may include a GRIN lens or a Fresnel lens.

The lens unit may further include a first substrate and a second substrate configured to face each other. A liquid crystal layer is positioned between the first substrate and the second substrate. The electrodes include a plurality of first electrodes and a plurality of second electrodes positioned on the first substrate.

The first electrodes may be positioned at a different layer from a layer at which the second electrodes are positioned.

The forming of the lens may include applying a common voltage to a common electrode positioned on the second substrate.

A voltage difference between the common electrode and the first electrode or the second electrode when the backlight unit emits the light of the first color may be different from a voltage difference between the common electrode and the first electrode or the second electrode when the backlight unit emits the light of the second color.

The driving method may further include focusing an image of the first color and an image of the second color for the same viewpoint at a same position through the lens unit at different times in a 3D mode.

In accordance with exemplary embodiments of the present invention, a display quality may be increased. For example, the resolution of a 3D image may be increased by equalizing a position at which an image of each viewpoint per primary color is focused in a display device for displaying a 3D image by using a lens.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
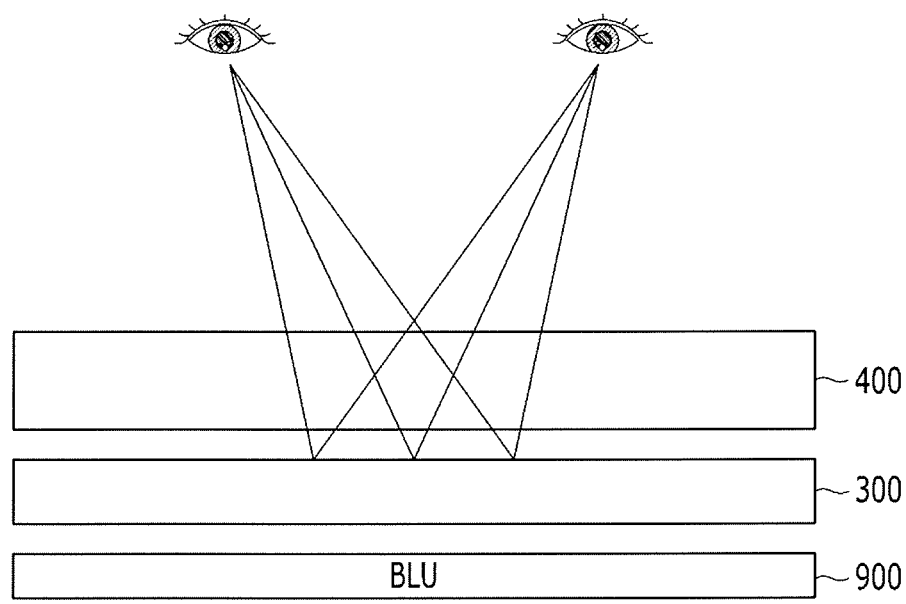
FIG. 1 is a cross-sectional view showing a schematic structure of a display device in accordance with an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

Hereinafter, a display device in accordance with an exemplary embodiment of the present invention and a driving method thereof will be described in detail with reference to the accompanying drawings.

A display device in accordance with an exemplary embodiment of the present invention is described below with reference to FIG. 1 through FIG. 4.

Figure 2:
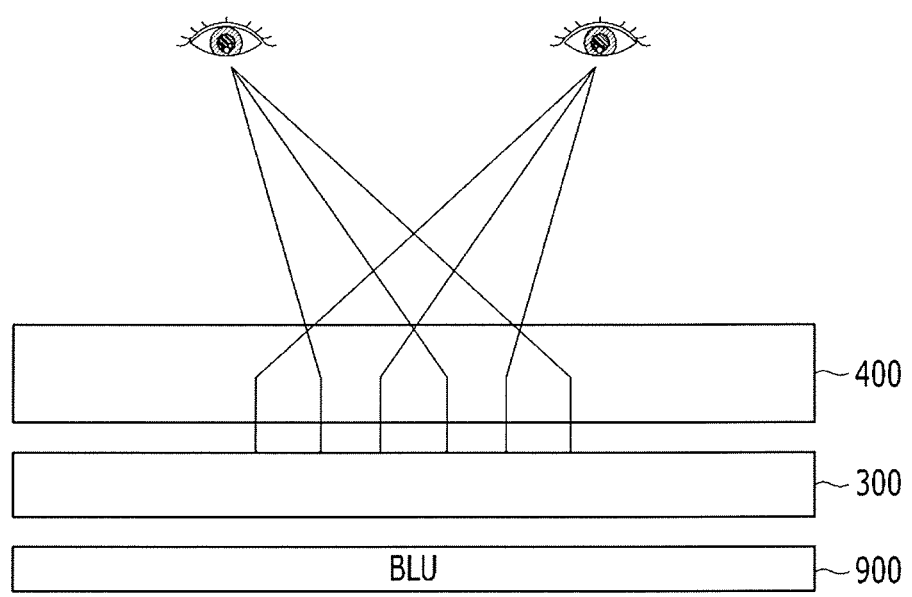
FIG. 2 is a cross-sectional view showing a method for forming a 2D image and a 3D image in accordance with exemplary embodiments of the present invention.
Figure 3:
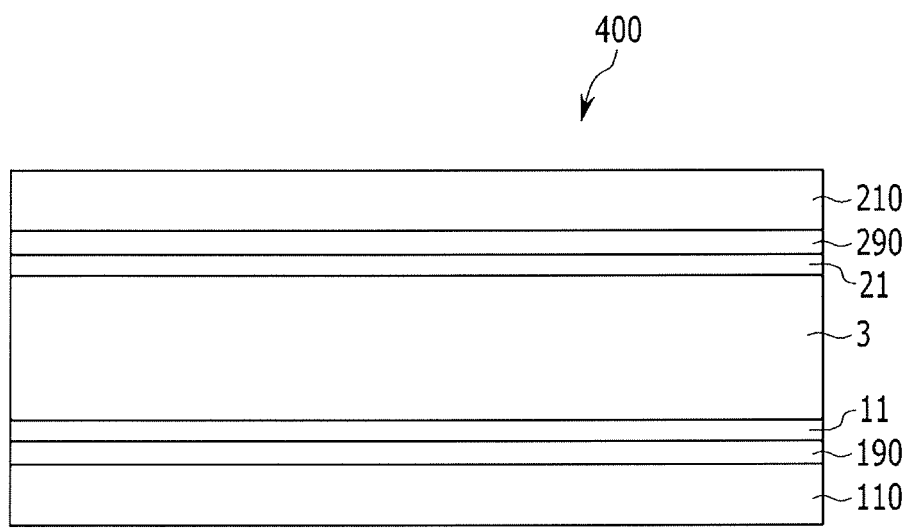
FIG. 3 is a cross-sectional view showing a lens unit in accordance with an exemplary embodiment of the present invention.
Figure 4:
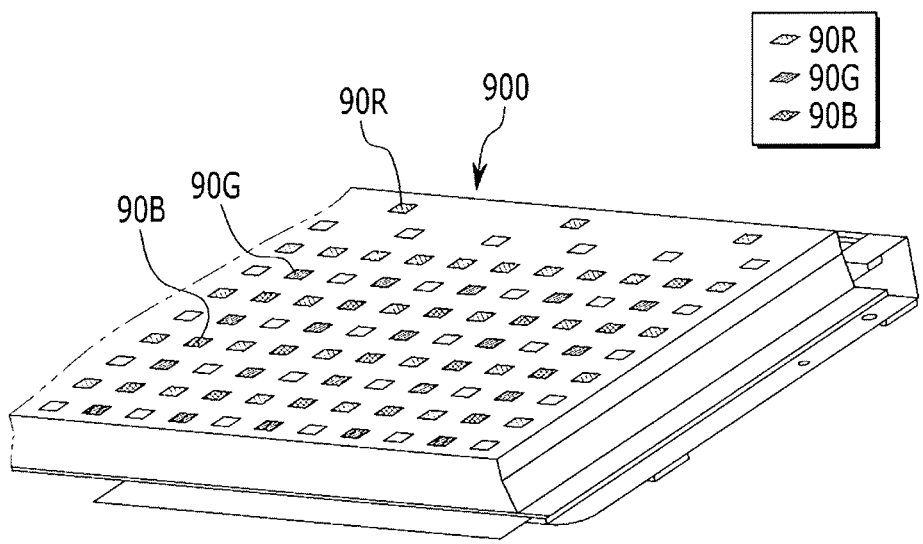
FIG. 4 is a schematic perspective view showing a backlight unit included in the display device in accordance with an exemplary embodiment of the present invention.

FIG. 1 and FIG. 2 are cross-sectional views respectively showing a schematic structure of the display device and methods for forming a 2D image and a 3D image in accordance with an exemplary embodiment of the present invention. FIG. 3 is a cross-sectional view showing a lens unit in accordance with an exemplary embodiment of the present invention, and FIG. 4 is a schematic perspective view showing a backlight unit included in the display device in accordance with an exemplary embodiment of the present invention.

Referring to FIG. 1 and FIG. 2, the display device in accordance with an exemplary embodiment of the present invention may be a non-emissive display device such as liquid crystal display. The display device includes a display panel 300, a lens unit 400 positioned in front of a front side of the display panel 300 on which an image is displayed, and a backlight unit (BLU) 900 positioned at a back side of the display panel 300 that is opposite to the front side.

The display panel 300 includes a plurality of pixels for displaying an image, and the pixels may be arranged in a matrix form.

The display panel 300 displays a 2D image of each frame in a 2D mode as shown in FIG. 1. A 3D image is displayed in a 3D mode by dividing various viewpoint images such as a left-eye image and a right-eye image by a spatial division method as shown in FIG. 2. In the 3D mode, some of the pixels can display an image corresponding to one viewpoint, and other pixels can display an image corresponding to the other viewpoint. The number of viewpoints may be two or more. Different pixels displaying a plurality of viewpoint images may be periodically arranged in one direction.

When the display device is a liquid crystal display, the display panel 300 may be driven according to various liquid crystal driving modes, e.g., a vertical alignment (VA) mode, a plane to line switching (PLS) mode, a horizontal alignment mode such as an in-plane switching (IPS) mode, a twisted nematic (TN) mode, a super TN (STN) mode, and an electrically controlled birefringence (ECB) mode.

The lens unit 400 serves to facilitate division of an image displayed by the display panel 300 per corresponding viewpoints. The lens unit 400 can be switched on and off. When the lens unit 400 is switched on, the display device is driven in the 3D mode. Further, as shown in FIG. 2, a plurality of lenses is formed to refract an image displayed by the display panel 300 to display the image at a corresponding viewpoint. When the lens unit 400 is switched off, the display device is driven in the 2D mode. Further, as shown in FIG. 1, the image displayed by the display panel 300 can pass through the lens without being refracted to display a 2D image.

For example, referring to FIG. 1, when the lens unit 400 is switched off, the same image reaches each of a left eye and a right eye of a viewer, and accordingly, the viewer may perceive a 2D image. Referring to FIG. 2, when the lens unit 400 is switched on, the image displayed by the display panel 300 is refracted through the lens unit 400, and thus the left-eye image may be directed to the viewer's left eye while the right-eye image is directed to the viewer's right eye, and the viewer may accordingly perceive a 3D image.

Referring to FIG. 3, the lens unit 400 in accordance with exemplary embodiments of the present invention may be a liquid crystal lens which controls a refractive index distribution by using liquid crystal to form a plurality of lenses.

The lens unit 400 may include a first substrate 110 and a second substrate 210 disposed to face each other and a liquid crystal layer 3 interposed therebetween. The first and/or second substrate may include an insulating material.

A first electrode layer 190 and an alignment layer 11 may be successively positioned on the first substrate 110. A second electrode layer 290 and an alignment layer 21 may be successively positioned on the second substrate 210.

The first electrode layer 190 and the second electrode layer 290 may each include a plurality of electrodes. The first 190 and second 290 electrode layers may be made of a transparent conductive material such as indium tin oxide (ITO) or indium zinc oxide (IZO). The first electrode layer 190 and the second electrode layer 290 generate an electric field at the liquid crystal layer 3 according to an applied voltage, thereby controlling the arrangement of liquid crystal molecules of the liquid crystal layer 3.

The alignment layers 11 and 21 determine the initial alignment of the liquid crystal molecules of the liquid crystal layer 3. The alignment layers 11 and 21 quickly arrange the direction of the liquid crystal molecules according to the electric field generated at the liquid crystal layer 3.

The liquid crystal layer 3 may be driven according to various liquid crystal driving modes, e.g., the VA mode, the PLS mode, the horizontal alignment mode such as the IPS mode, the TN mode, the STN mode, and the ECB mode. For example, in the case of the VA mode, the liquid crystal molecules might not be twisted from the first substrate 110 to the second substrate 210 in the initial alignment state.

The lens unit 400, according to an exemplary embodiment of the present invention, is switched off to form no film when no voltage is applied to the first electrode layer 190 and the second electrode layer 290. When the voltage is applied to the first electrode layer 190 and the second electrode layer 290, the liquid crystal molecules of the liquid crystal layer 3 are rearranged to form a plurality of lenses. Alternatively, the lenses may be formed when the lens unit 400 is switched off, while no lens may be formed when the lens unit 400 is switched on.

Referring to FIG. 1 and FIG. 2 again, the backlight unit 900 supplies light to the display panel 300. For this, the backlight unit 900 includes at least one light source. As an example of the light source, a cold cathode fluorescent lamp (CCFL), a flat fluorescent lamp (FFL), and a light emitting diode (LED), or the like may be included.

Referring to FIG. 4, the backlight unit 900, according to an exemplary embodiment of the present invention, may include a plurality of light sources 90R, 90G, and 90B which respectively emit light of a primary color. Examples of the primary colors are three primary colors including red, green, and blue, or four primary colors. As used herein, primary colors are understood to be any set of colors that may be combined to form a desired color. A red light source 90R for emitting red light, a green light source 90G for emitting green light, and a blue light source 90B for emitting blue light are shown in FIG. 4, but they are not limited thereto. Alternatively, other types of light sources or light sources for emitting light of more primary colors may be included.

FIG. 4 shows a direct type of backlight unit in which light is emitted from the light sources 90R, 90G, and 90B directly toward an upper side thereof, but it is not limited thereto. Alternatively, it may be an edge type of backlight unit in which the light is emitted toward the upper side through a light guide.

In accordance with an exemplary embodiment of the present invention, the light sources 90R, 90G, and 90B of the backlight unit 900 are driven in a time division manner according to a field sequential driving method, and thus light of different primary colors can be directed to the display panel 300 during different frames. For example, the backlight unit 900 can alternately emit red light, green light, and blue light in consecutive frames.

Accordingly, the display panel 300 alternately displays images per primary color with respect to time, and as a result, a desired color may be recognized by the temporal sum of the primary colors. For example, when the display panel 300 receives a data voltage for a red image signal, the backlight unit 900 can emit red light by synchronizing with driving timing of the display panel 300. When the display panel 300 receives a data voltage for a green image signal, the backlight unit 900 can emit green light by synchronizing with the driving timing of the display panel 300. When the display panel 300 receives a data voltage for a blue image signal, the backlight unit 900 can emit blue light by synchronizing with the driving timing of the display panel 300.

Hereinafter, exemplary types of lenses that can be formed by the lens unit 400 used in the display device in accordance with exemplary embodiments of the present invention are described below with reference to FIG. 5 to FIG. 7 as well as FIG. 1 and FIG. 2.

Figure 5:
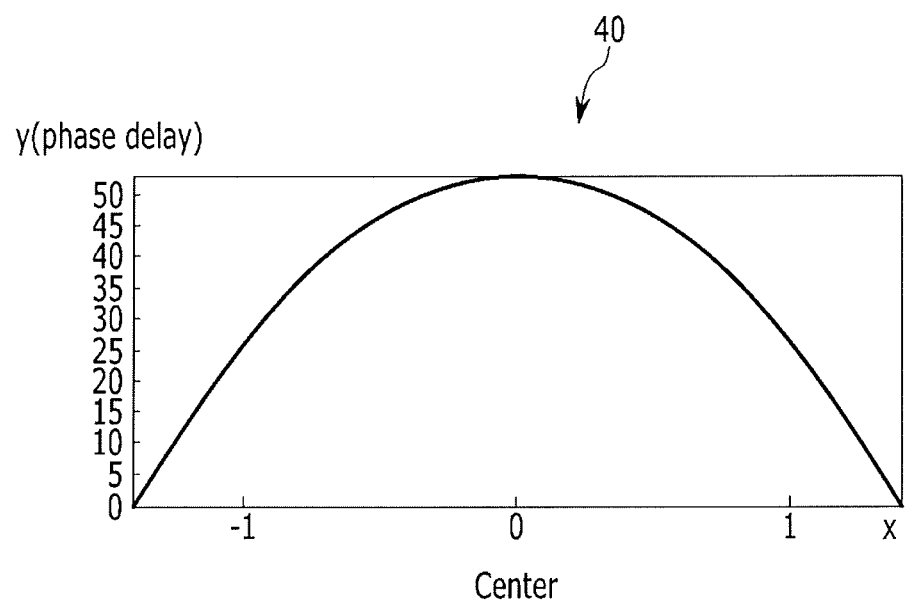
FIG. 5 to FIG. 7 are graphs showing phase delays according to positions of a lens caused by the lens unit included in the display device in accordance with exemplary embodiments of the present invention.
Figure 6:
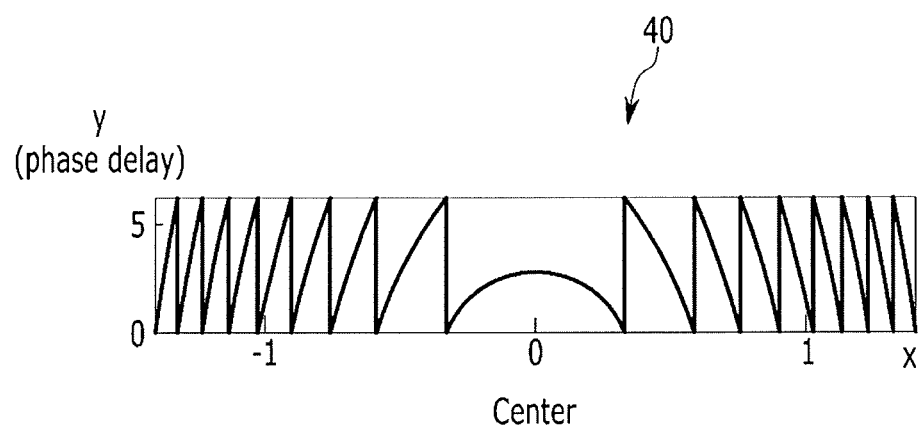
Figure 7:
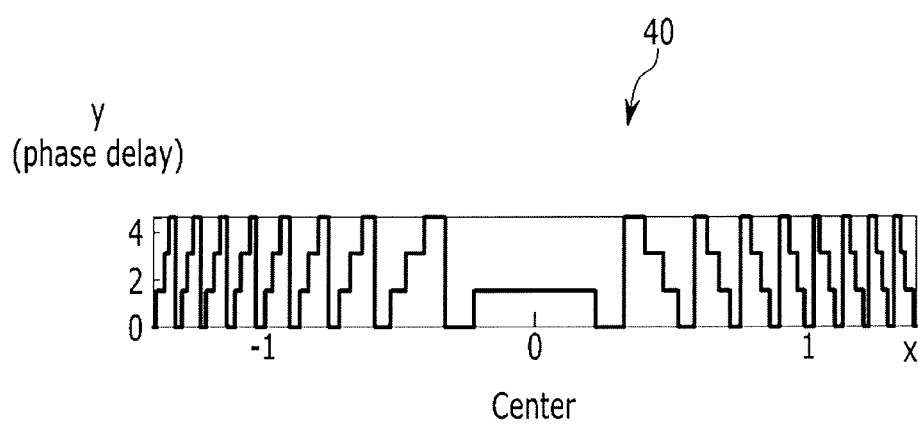

FIG. 5 to FIG. 7 are graphs showing phase delays (y-axis) according to positions (x-axis) of a lens caused by the lens unit included in the display device in accordance with exemplary embodiments of the present invention.

When the lens unit 400 included in the display device is switched on, various types of lenses generated according to phase delays caused by a refractive index distribution may be formed.

For example, referring to FIG. 5, a lens 40 formed when the lens unit 400, according to exemplary embodiments of the present invention, is switched on may be a gradient index (GRIN) lens. The GRIN lens has a phase delay of incident light caused by the refractive index distribution, which is similar to that of the solid convex lens, thereby obtaining substantially the same optical characteristic as that of a solid convex lens. When the lens unit 400 is a liquid crystal lens as described above, as shown in FIG. 3, a cell gap of the liquid crystal layer 3 may be increased.

Referring to FIG. 6 and FIG. 7, the lens 40 formed when the lens unit 400 of the present exemplary embodiment is switched on may be a Fresnel lens. The Fresnel lens is a lens that uses an optical characteristic of a Fresnel zone plate, and may have an effective phase delay which is identical to or similar to that of the solid convex lens or the GRIN lens since the refractive index distribution is periodically repeated.

A phase modulation type among the Fresnel zone plates may include a kinoform zone plate, a sinusoidal phase modulation zone plate, binary phase modulation zone plate, a multi-level phase modulation zone plate, and the like.

FIG. 6 illustrates an example of a phase delay according to a refractive index distribution of a lens in the case of using the kinoform zone plate. In the case of using the lens 40 shown in FIG. 6, the effective phase delay may be substantially the same as that of the solid convex lens or the GRIN lens.

FIG. 7 illustrates an example of a phase delay according to a refractive index distribution of a lens in the case of using the multi-level phase modulation zone plate. In the case of the lens 40 shown in FIG. 7, the effective phase delay is similar to that of the solid convex lens or the GRIN lens, but refractive index or phase delay values are changed in a stepwise form. Accordingly, discontinuous points appear to generate diffraction of incident light.

As such, the lens unit 400, according to exemplary embodiments of the present invention, may form various types of lenses. Further, a refractive index of the lens 40 formed by the lens unit 400 may be varied according to a wavelength of light emitted from the backlight unit 900 to the display panel 300. For example, the refractive index of the lens 40 formed by the lens unit 400 may be increased as the wavelength of light emitted from the backlight unit 900 to the display panel 300 is increased. For example, a refractive index of the lens 40 formed by the lens unit 400 when the backlight unit 900 emits red light may be greater than that of the lens 40 formed by the lens unit 400 when the backlight unit 900 emits blue light.

Hereinafter, a detailed structure of the lens unit 400 in accordance with exemplary embodiments of the present invention will be described with reference to FIG. 8 to FIG. 10 as well as the aforementioned drawings.

Figure 8:
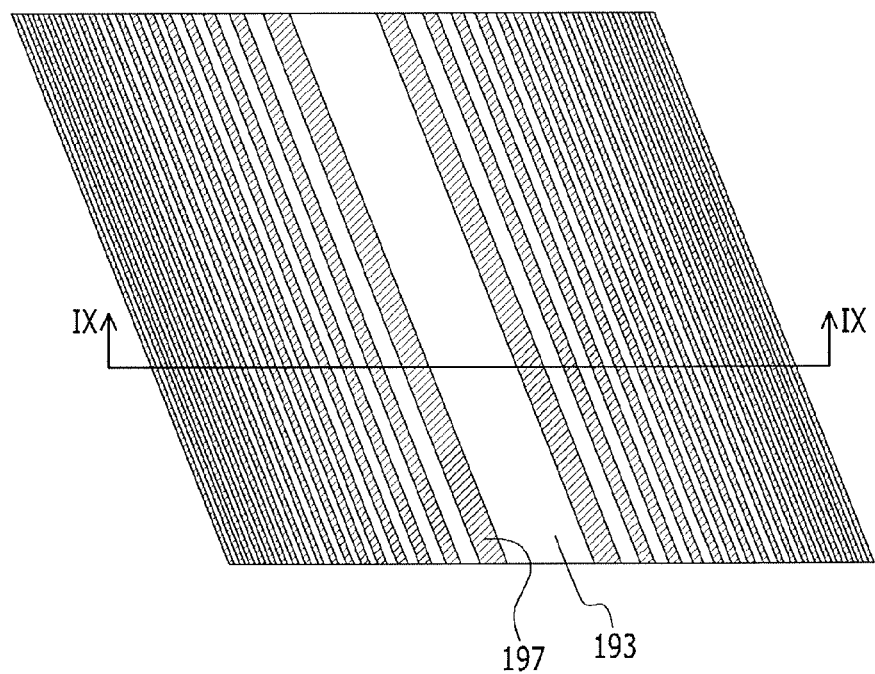
FIG. 8 is a top plan view showing electrodes included in the lens unit of the display device in accordance with exemplary embodiments of the present invention.
Figure 9:
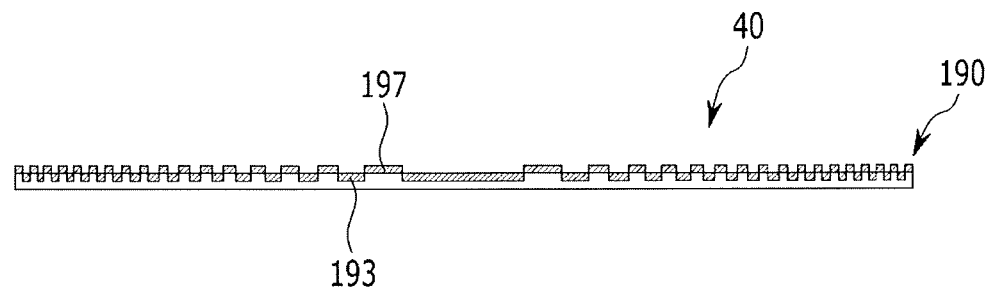
FIG. 9 is a cross-sectional view showing the electrodes included in the lens unit of the display device in accordance with exemplary embodiments of the present invention.
Figure 10:
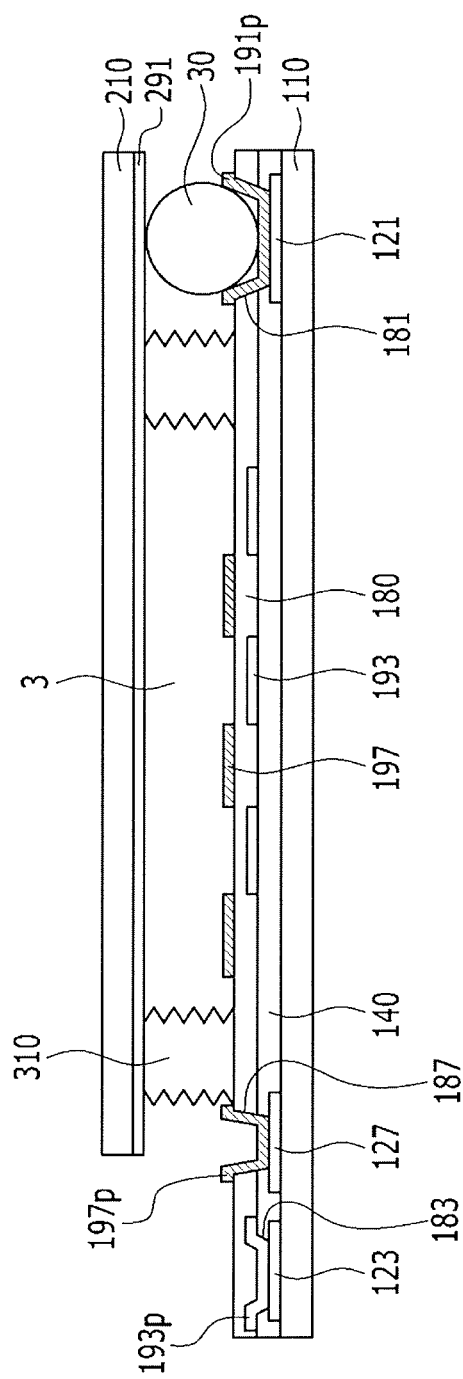
FIG. 10 is a detailed cross-sectional view showing the lens unit included in the display device in accordance with exemplary embodiments of the present invention.

FIG. 8 is a top plan view showing electrodes included in the lens unit of the display device in accordance with exemplary embodiments of the present invention, FIG. 9 is a cross-sectional view showing the electrodes included in the lens unit of the display device in accordance with exemplary embodiments of the present invention, and FIG. 10 is a detailed cross-sectional view showing the lens unit included in the display device in accordance with exemplary embodiments of the present invention.

First, referring to FIG. 10, the lens unit 400 includes the first substrate 110 and the second substrate 210 disposed to face each other, and the liquid crystal layer 3 interposed therebetween.

A first signal line 123, a second signal line 127, and a third signal line 121 may be positioned on the first substrate 110. The first signal line 123, the second signal line 127, and the third signal line 121 may transfer different signals.

A first insulating layer 140 may be positioned on the first signal line 123, the second signal line 127, and the third signal line 121. The first insulating layer 140 includes a contact hole 183 through which a portion of the first signal line 123 is exposed.

A plurality of first electrodes 193 and a first connection member 193p are positioned on the first insulating layer 140. The first electrodes 193 are positioned at the same layer.

Referring to FIG. 8 and FIG. 9, the first electrodes 193 may extend in parallel with each other and incline in an oblique direction. In an example in which the lens unit 400 forms a Fresnel lens, the first electrodes 193 may be positioned at a region at which each lens is formed, and distances between horizontally directional widths of the first electrodes 193 and the first electrodes 193 may gradually become narrower from the lens center toward the outside. Widths of the first electrodes 193 positioned to correspond to the center of each lens may be widest.

The first connection member 193p is electrically and physically connected to the first signal line 123 through the contact hole 183. The first connection member 193p may be positioned at the same layer as that of that of the first electrodes 193, and may be connected to at least one of the first electrodes 193 to transfer a signal from the first signal line 123. The first connection member 193p may be connected to the first electrodes 193 disposed per a group of a predetermined number of first electrodes 193.

Referring to FIG. 10 again, a second insulating layer 180 is positioned on the first electrode 193. The second insulating layer 180 and the first insulating layer 140 include a contact hole 187 through which the second signal line 127 is partially exposed and a contact hole 181 through which the third signal line 121 is partially exposed.

A plurality of second electrodes 197, a second connection member 197p, and a contact assistant 191p are positioned on the second insulating layer 180.

Referring to FIG. 8 and FIG. 9, the second electrodes 197 are positioned at the same layer. The second electrodes 197 may extend in parallel with each other and in a direction that is parallel with the direction in which the first electrodes 193 are inclined. In the example in which the lens unit 400 forms a Fresnel lens, the first electrodes 193 may be positioned at a region at which each lens is formed, and distances between horizontally directional widths of the second electrodes 197 and the second electrodes 197 may gradually become narrower from the lens center toward the outside.

The first electrodes 193 and the second electrodes 197 may be alternately disposed in such a way that the first electrode 193 and the second electrode 197 that are adjacent to each other are not overlapped with each other. One of the first electrode 193 and the second electrode 197 that is closer to the center of each lens may have a wider width.

The first electrodes 193, the second insulating layer 180, and the second electrodes 197 may constitute the first electrode layer 190 in accordance with exemplary embodiments of the present invention.

As described above, as shown in FIG. 8 to FIG. 10, the lens unit 400 can form a lens embodying a Fresnel lens, or specifically, a multi-level phase modulation zone plate.

The second connection member 197p and the contact assistants 191p are respectively physically connected to the second signal line 127 and the third signal line 121 through the contact holes 187 and 181. The second connection member 197p may be positioned at the same layer as that of that of the second electrodes 197, and may be connected to at least one of the second electrodes 197 to transfer a signal from the second signal line 127. The second connection member 197p may be connected to the second electrodes 197 disposed per a group of a predetermined number of second electrodes 197.

A common electrode 291 is formed on the second substrate 210. The common electrode 291 may be formed on an entire surface of the second substrate 210 to receive a predetermined voltage such as a common voltage Vcom. The common electrode 291 may form the second electrode layer 290 in accordance with exemplary embodiments of the present invention.

The first electrode 193, the second electrode 197, the first connection member 193p, the second connection member 197p, the contact assistants 191p, and the common electrode 291 may be made of a transparent conductive material such as ITO, IZO, or the like.

A sealant 310 is positioned between the first substrate 110 and the second substrate 210 to attach the first substrate 110 to the second substrate 210. Liquid crystal is injected into a region surrounded by the sealant 310 so as to form the liquid crystal layer 3.

The liquid crystal layer 3 includes liquid crystal molecules. As described above, the liquid crystal molecules may be aligned according to various driving modes.

A short member 30 may be positioned between the contact assistant 191p and the common electrode 291. The common electrode 291 may receive a predetermined voltage such as a common voltage from the third signal line 121 through the short member 30 and the contact assistants 191p.

Hereinafter, a structure and an operation of the lens unit 400 in accordance with an exemplary embodiment of the present invention will be described with reference to FIG. 11 and FIG. 12.

Figure 11:
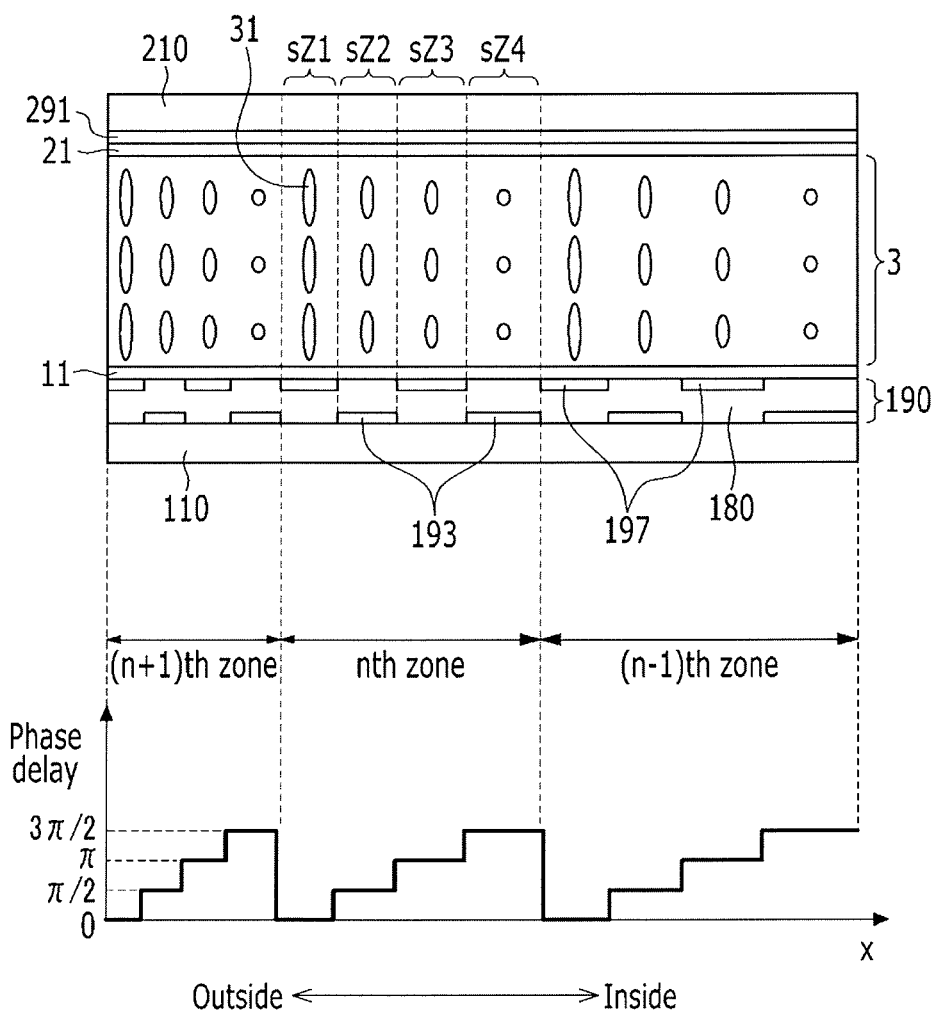
FIG. 11 is a cross-sectional view showing the lens unit included in the display device and a graph showing a pertinent phase delay in accordance with exemplary embodiments of the present invention.
Figure 12:
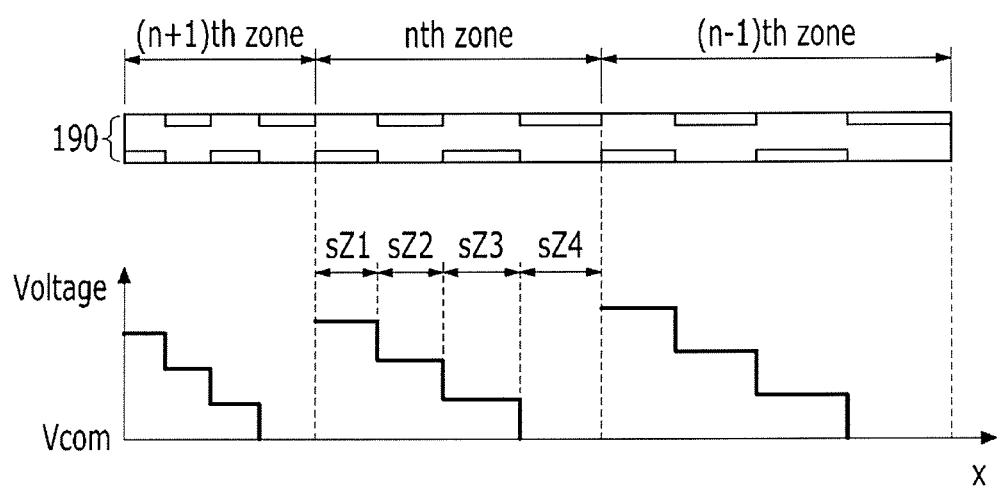
FIG. 12 shows a voltage that is applied to an electrode included in the lens unit shown in FIG. 11.

FIG. 11 is a cross-sectional view showing the lens unit included in the display device and a graph showing a pertinent phase delay in accordance with exemplary embodiments of the present invention, and FIG. 12 shows a voltage that is applied to an electrode included in the lens unit shown in FIG. 11.

Since the lens unit 400 is substantially the same as the lens unit 400 illustrated in FIG. 8 to FIG. 10 described above, those elements not described below may be understood to be similar to those discussed above with reference to FIGS. 8-10.

Referring to FIG. 11, the lens unit 400, in accordance with exemplary embodiments of the present invention, includes the first substrate 110 and the second substrate 210 disposed to face each other, and the liquid crystal layer 3 interposed therebetween.

The first electrode 190 and the alignment layer 11 are successively formed on the first substrate 110, and the common electrode 291 and the alignment layer 21 are successively formed on the second substrate 210.

The first electrode layer 190 includes the first electrodes 193, the second insulating layer 180 positioned on the first electrode 193, and the second electrodes 197 positioned on the second insulating layer 180.

In an example where the lens unit 400 forms the Fresnel lens, one lens may include a plurality of zones that are symmetric with respect to the center. FIG. 11 shows an $(n-1)^{th}$ zone, a $4^{th}$ zone, and a $(n+1)^{th}$ zone among the zones. For example, two first electrodes 193 and two second electrodes 197 may be positioned at each zone. In each zone, regions at which the electrodes 193 and 197 are positioned form respectively subzones sZ1, sZ2, sZ3, and sZ4.

The alignment layer 11 may be coated on the second electrode 197, and the alignment layer 21 may be coated on the common electrode 291.

The liquid crystal layer 3 includes liquid crystal molecules 31.

Further, it is to be understood that features discussed with respect to any one figure presented herein may be combined with various other features discussed with respect to any other figures presented herein.

Hereinafter, the operation of the lens unit 400 will be described with reference to FIG. 13 and FIG. 14

First, referring to FIG. 11 and FIG. 12, when the lens unit 400 is driven to form a Fresnel lens. A multi-level phase modulation zone plate, the first electrode 193 and the second electrode 197 of each zone can receive a step-shape voltage of which the magnitude is gradually increased from the center of the lens toward the outside. For example, the second electrode 197 of the subzone sZ4 may receive a common voltage Vcom, the first electrode 193 of the subzone sZ3 may receive a voltage of a first level, the second electrode 197 of the subzone sZ2 may receive a voltage of a second level that is larger than the first level, and the first electrode 193 of the subzone sZ1 may receive a voltage of a third level that is larger than the second level. The first electrodes 193 and the second electrodes 197 positioned at the same subzones sZ1, sZ2, sZ3, and sZ4 of all zones of the Fresnel lens may receive the same voltage.

The common voltage Vcom is applied to the common electrode 291.

When the common voltage Vcom is applied to the common electrode 291 and a voltage is applied to the first electrode 193 and the second electrode 197 as shown in FIG. 12, an electric field is generated in the liquid crystal layer 3, thereby arranging the liquid crystal molecules 31 thereof as shown in FIG. 11. For example, when the liquid crystal layer 3 includes the liquid crystal molecules 31 that are horizontally aligned, the liquid crystal molecules 31 of the subzone sZ4 maintain a horizontal alignment with respect to the surfaces of the substrates 110 and 210, and the liquid crystal molecules 31 of the liquid crystal layer 3 are gradually arranged in a direction that is perpendicular to the surfaces of the substrates 110 and 210 from the subzone sZ3 toward the sZ1. However, in the case that the liquid crystal layer 3 is aligned in another driving mode, when an electric field is generated, the liquid crystal molecules 31 of the liquid crystal layer 3 may be arranged differently.

As such, by adjusting the arrangement of the liquid crystal molecules 31 of the liquid crystal layer 31 at the subzones sZ1, sZ2, sZ3, and sZ4, a phase delay value of the liquid crystal layer 3 positioned at each of the subzones sZ1, sZ2, sZ3, and sZ4 can be changed into a step shape as shown in FIG. 11. For example, the phase delay value for each zone of the Fresnel lens can be stepwise increased toward the center of the lens, thereby forming the Fresnel lens which embodies the multi-level phase modulation zone plate.

In accordance with exemplary embodiments of the present invention, as the voltage applied to the first electrode 193 or the second electrode 197 is increased, a phase delay value of the liquid crystal layer 3 becomes smaller, but it is not limited thereto. Alternatively, the phase delay value of the liquid crystal layer 3 may become larger according to a liquid crystal driving mode as the voltage applied to the first electrode 193 or the second electrode 197 is increased.

As such, by adjusting voltages applied to the common electrode 291, the first electrode 193, and the second electrode 197, the phase delay of the liquid crystal layer 3 at each zone is multi-leveled, thereby forming the multi-level phase modulation zone plate. Further, it is possible to refract light that passes through each zone of the lens formed by the lens unit 400 to a focal point thereof by using light diffraction, destructive interference, and constructive interference.

As such, when the lens unit 400 is switched on to form a plurality of lenses, the display panel 300 can be divided into viewpoints and displayed in a 3D mode so that a viewer can view a corresponding stereoscopic image.

In contrast, when the same voltage is applied to the first electrode 193 and the second electrode 197, no lens is formed. As a result, a viewer can view an image displayed by the display panel 300 in a 2D mode.

In accordance with an exemplary embodiment of the present invention, the backlight unit 900 sequentially outputs light per primary color with respect to time. When an image of different primary colors is displayed, the same refractive index of the lenses 40 formed by the lens unit 400 may cause a chromatic aberration due to different refraction degrees per wavelength. Then, the effective refractive index per wavelength of the primary colors becomes different, and thus the positions of viewpoints also become different, thereby being seen as a moiré pattern.

However, in accordance with exemplary embodiments of the present invention, a signal, e.g., a level of a voltage applied to a plurality of electrodes, applied to the first electrodes 193 and the second electrodes 197 can be differently adjusted. Accordingly, when an image per primary color is displayed at a different time in the 3D mode, the image of different primary colors for the same viewpoint can be displayed at the same position for the same viewpoint by differently adjusting the refractive indexes of the lenses 40 formed by the lens unit 400.

When the display panel 300 receives a data voltage for an image signal per primary color and the backlight unit 900 emits a corresponding primary color light to the display panel 300 by synchronizing with the data voltage to thereby display an image per primary color, the lens unit 400 can also adjust the refractive index of the lens 40 formed by synchronizing with driving timing of the display panel 300 and the backlight unit 900 so that the image per primary color for the same viewpoint can be focused at the same position for the same viewpoint to be viewed.

As such, as described above with reference to FIG. 11 and FIG. 12, as the method for adjusting the refractive index of the lens 40, the phase delay value of the liquid crystal layer 3 can be adjusted by adjusting voltage differences between the first electrode 193 and the second electrode 197 and the common electrode 291. For example, a variation of voltage difference between the common electrode 291 and the first electrode 193 and the second electrode 197 positioned at each zone according to the subzone is relatively increased when the display panel 300 displays a red image, as compared with when the display panel 300 displays a blue image, thereby improving the refractive index of the lens unit 40.

Figure 13:
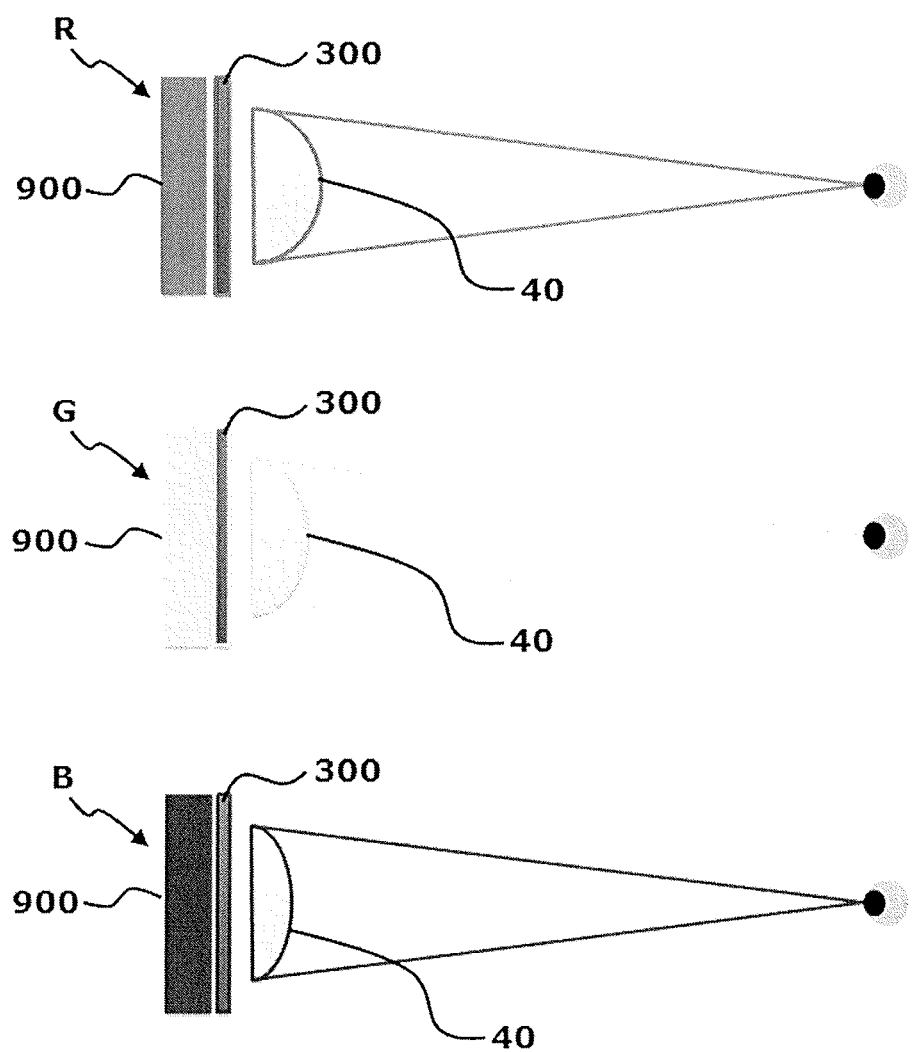
FIG. 13 is an illustration of a position of a view point at which an image of each primary color is displayed when the backlight unit included in the display device supplies light of different primary colors to a display panel in accordance with exemplary embodiments of the present invention.
Figure 14:
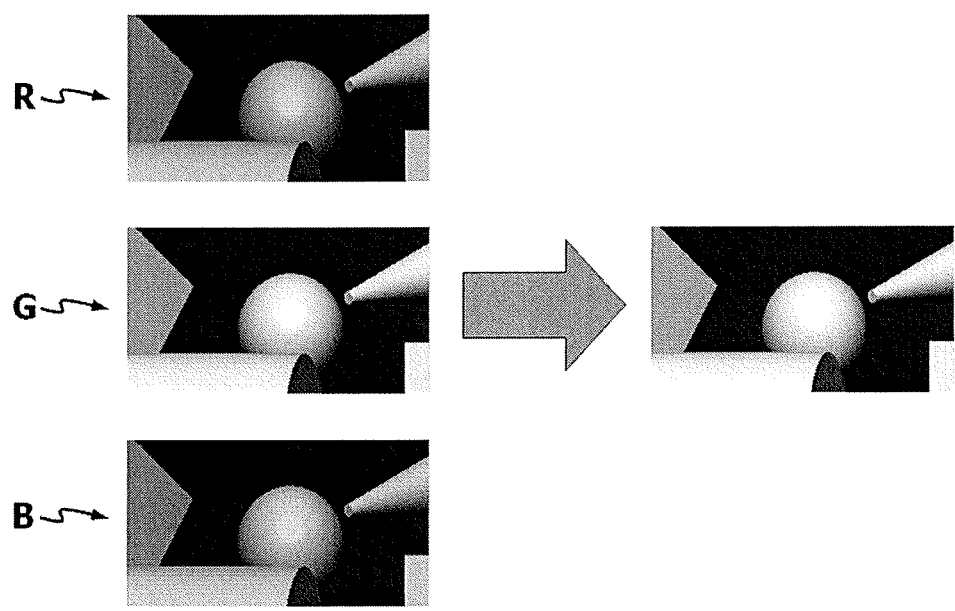
FIG. 14 is an illustration of 3D images viewed by a viewer when the display device sequentially displays images per primary color in accordance with exemplary embodiments of the present invention.

FIG. 13 shows a position of a view point at which an image of each primary color is displayed when the backlight unit included in the display device supplies light of different primary colors to a display panel in accordance with exemplary embodiments of the present invention.

Referring to FIG. 13, when backlight unit 900 supplies light of different primary colors R, G, and B to the display panel 300, the refractive index of the lens 40 formed by the lens unit 400 is differently adjusted, so that effective refractive indexes of the lens 40 per wavelength band of the primary colors may be substantially the same and light paths per primary color may also be the same. Accordingly, a focus of an image per primary colors R, G, and B for the same viewpoint is focused at the same viewpoint, so that a 3D image can be viewed without generating a moiré pattern, as shown in FIG. 14.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising: a display panel including a plurality of pixels; a backlight unit disposed at a back side of the display panel, the backlight unit emitting light of a first color and light of a second color to the display panel at different times, the first color and the second color being different from each other; and a lens unit positioned at a front side of the display panel forming at least one lens when the lens unit is operating in a 3D mode, wherein the lens unit includes a plurality of electrodes configured to adjust a refractive index of the lens, and a signal applied to the plurality of electrodes when the backlight unit emits the light of the first color is different from a signal applied to the plurality of electrodes when the backlight unit emits the light of the second color, wherein an image of the first color and an image of the second color for the same viewpoint as each other are focused at a same position for the viewpoint through the lens unit in a 3D mode.

2. The display device of claim 1, wherein the refractive index of the lens when the backlight unit emits the light of the first color is different from the refractive index of the lens when the backlight unit emits the light of the second color.

3. The display device of claim 2, wherein the lens includes a gradient index (GRIN) lens or a Fresnel lens.

4. The display device of claim 3, wherein the lens unit further includes:
   a first substrate;
   a second substrate facing the first substrate; and
   a liquid crystal layer disposed between the first substrate and the second substrate, and
   the plurality of electrodes include a plurality of first electrodes positioned on the first substrate and a plurality of second electrodes positioned on the first substrate.

5. The display device of claim 4, wherein the plurality of first electrodes is positioned at a different layer from a layer at which the plurality of second electrodes is positioned.

6. The display device of claim 5, wherein the lens unit further includes a common electrode positioned on the second substrate and configured to receive a common voltage.

7. The display device of claim 6, wherein a voltage difference between the common electrode and the plurality of first electrodes or between the common electrode and the plurality of second electrodes when the backlight unit emits the light of the first color is different from a voltage difference between the common electrode and the plurality of first electrodes or between the common electrode and the plurality of second electrodes when the backlight unit emits the light of the second color.

8. The display device of claim 1, wherein the lens includes a gradient index (GRIN) lens or a Fresnel lens.

9. The display device of claim 1, wherein the lens unit further includes:
   a first substrate;
   a second substrate facing the first substrate; and
   a liquid crystal layer disposed between the first substrate and the second substrate, and
   the plurality of electrodes include a plurality of first electrodes positioned on the first substrate and a plurality of second electrodes positioned on the first substrate.

10. A display device, comprising: a display panel; a backlight unit providing a first light to the display panel at a first time and providing a second light to the display panel at a second time different from the first time, the second light being of a different wavelength than the first light; and a lens unit refracting light from the display panel, the lens unit having a first index of refraction during the first time and a second index of refraction, different from the first index of refraction, during the second time, wherein all image of the first color and an image of the second color for the same viewpoint as each other are focused at a same position for the viewpoint through the lens unit in a 3D mode.

* * * * *